US005282638A

United States Patent [19]

Harper

[11] Patent Number: 5,282,638

[45] Date of Patent: Feb. 1, 1994

[54] CONVERSION DEVICE FOR DRILLS

[76] Inventor: David L. Harper, 809 Carlisle Court North Donelson, Tenn. 37214

[21] Appl. No.: 998,874

[22] Filed: Dec. 29, 1992

Related U.S. Application Data

[63] Continuation of Ser. No. 791,023, Nov. 12, 1991, abandoned.

[51] Int. Cl.[5] .................................... B23B 51/12

[52] U.S. Cl. .................................... 279/144; 81/177.85; 408/239 A

[58] Field of Search ............... 81/177.1, 177.2, 177.85, 81/438; 279/142–145, 223, 158; 408/239 R, 239 A

[56] References Cited

U.S. PATENT DOCUMENTS

| | | | |
|---|---|---|---|
| 1,864,466 | 6/1932 | Peterson | 279/76 |
| 2,301,981 | 11/1942 | Steffens | 408/141 |
| 2,374,919 | 5/1945 | Bruseth | 409/233 |
| 2,627,330 | 2/1953 | Gantz | 81/62 |
| 2,987,334 | 6/1961 | Wendling | 279/76 |
| 3,172,675 | 3/1965 | Gonzalez | 279/76 |
| 3,364,800 | 1/1968 | Benjamin et al. | 274/20 |
| 3,734,515 | 5/1973 | Dudek | 279/1 A |
| 3,843,143 | 10/1974 | Laxson | 279/144 |
| 3,924,493 | 12/1975 | Penner | 279/79 X |
| 4,251,120 | 2/1981 | Wolff | 173/217 X |
| 4,339,970 | 7/1982 | Enstrom | 81/177.85 X |
| 4,514,117 | 4/1985 | Scott | 408/239 R |
| 4,548,532 | 10/1985 | Watanabe et al. | 408/239 A X |
| 4,750,750 | 6/1980 | Batalorf, Jr. | 408/239 A |
| 4,794,828 | 1/1989 | Olson | 81/177.85 |

FOREIGN PATENT DOCUMENTS

| | | | |
|---|---|---|---|
| 1015554 | 8/1977 | Canada | 408/239 A |

*Primary Examiner*—Steven C. Bishop
*Attorney, Agent, or Firm*—Casey F. Wilson; Rick R. Wascher

[57] ABSTRACT

A device for converting power or hand drills to drive sockets. The cylinder of the device attaches to the drill in place of the chuck, or, with an adaptor, as a bit would fit in the chuck. The cylinder also houses the known, toothed gear assembly which drives the socket. The cylinder is surrounded by a slidable ring and pierced by a push rod attached to opposite sides of the ring. The ring and push rod are pushed forward, and the push rod activates the release mechanism of the gear assembly.

16 Claims, 2 Drawing Sheets

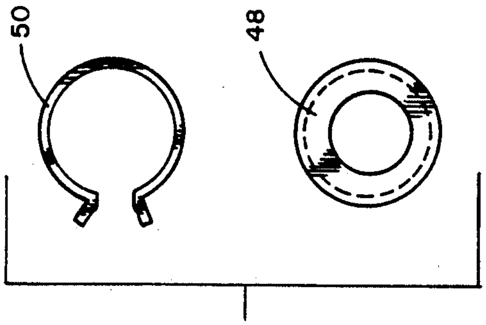
FIG. 5
FIG. 5
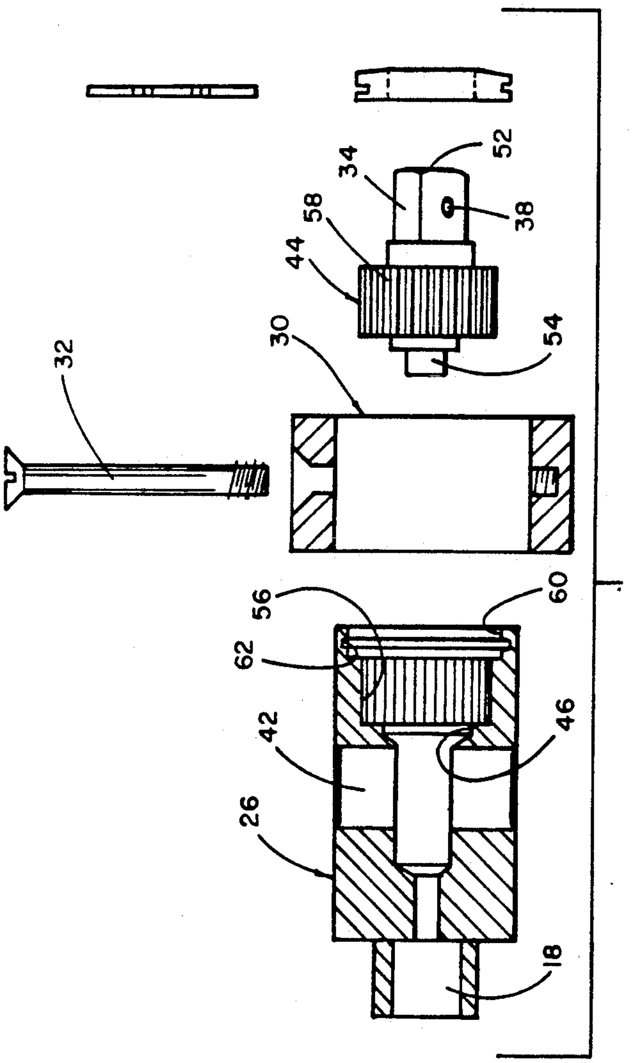
FIG. 4
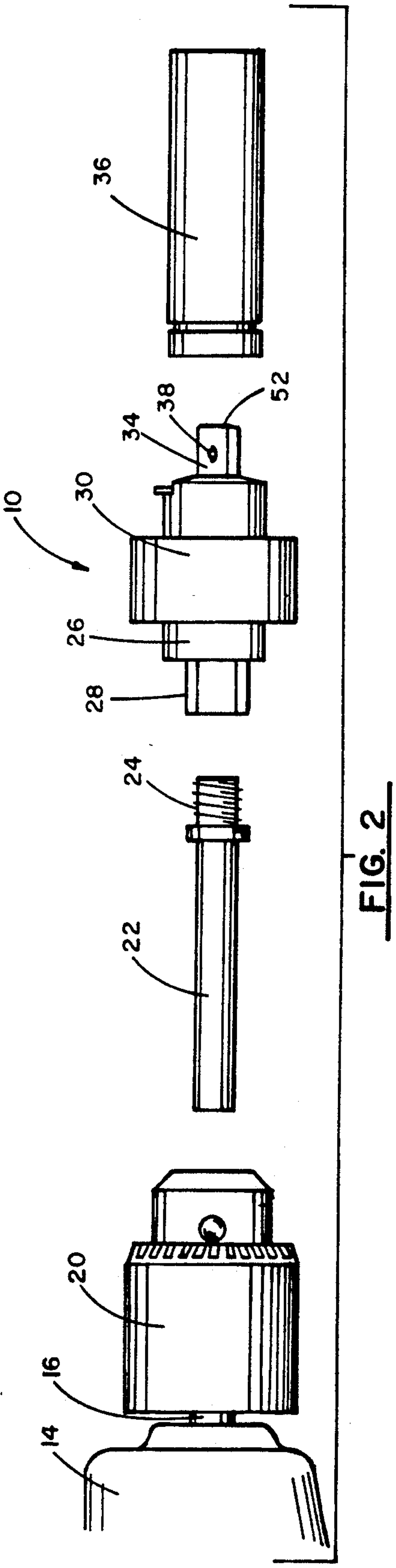
FIG. 2

CONVERSION DEVICE FOR DRILLS

This is a continuation of application Ser. No. 07/791,023 filed on Nov. 12, 1991, now abandoned.

BACKGROUND OF THE INVENTION

1. Field of the Invention

The present invention relates generally to devices for tightening nuts, bolts and other fasteners, but more particularly to tool chucks used with other tools to accomplish the aforementioned tightening operations.

2. Description of the Related Art

Some of the devices which partially comprise the art to which the invention relates, includes U.S. Pat. No. 4,339,970 granted to Enstrom, incorporated by reference as if fully set forth herein, and directed to a serviceable, releaseable socket retaining ratchet.

The internal working components of the Enstrom ratchet shown in FIGS. 1-3, namely, the combination of the drive lug member 30, shank member 20, button 40, pin 60, spring 50, plate 16 and clip 18, is designed to releaseably engage a tool such as a socket enabling a ratchet or other rotatable device to impart a rotatable force on the socket and thus on a fastener such as a bolt, nut, or screw head.

Similarly, U.S. Pat. No. 4,514,117 incorporated by reference as if fully set forth herein, and granted to Scott for a quick change tool holder and tool, enables a tool to be easily connected and disconnected from a rotatable chuck portion of a tool.

U.S. Pat. No. 2,301,981 granted to Steffens on Nov. 17, 1942, incorporated by reference as if fully set forth herein, is directed to a drill.

SUMMARY OF THE INVENTION

The present invention is an adapter for a drill, preferably of the hand held variety. The adapter can be referred to as a tool chuck, because it is used with the rotatable portion or drive shaft of the drill and is designed to hold other tools such as sockets for tightening fasteners (e.g., bolts, nuts, screws, etc.).

The invention includes a cylindrical body member adapted for rotational engagement with the rotatable portion (shaft) of the drill. The cylindrical body is configured with an internally splined portion serving as a cooperating component of a torque transmitting spline configuration.

The other cooperating component of the invention having the corresponding cooperating torque transmitting spline structure is a gear assembly having an exterior geared portion. The cylinder member removably receives the gear assembly such that the cylinder splines engage the geared portion of the gear assembly to prevent rotational movement therebetween.

The gear assembly is configured for attachment of a tool such as a socket. When a socket is attached, the attachment allows the socket to move rotatably with the cylinder member.

The gear assembly is held in its installed operable position with respect to the cylinder member by a retaining means such as a bearing plate and snap ring configuration.

The above-mentioned internal working components of the ratchet assembly of Enstrom, U.S. Pat. No. 4,339,970, is a suitable example of the configuration of the gear assembly of the present invention. In fact, the aforementioned Enstrom components are useful with the cylinder member of the present invention.

The preferred gear assembly incorporates a releasing mechanism for disengaging or releasing a tool therefrom. The releasing mechanism includes an actuator or actuating means.

A sliding collar mechanism, associated with the cylinder member, engages the actuating means causing the releasing mechanism to release the tool or socket. The sliding collar mechanism includes a collar and a push rod transversely mounted to the sliding collar to enable the push rod to engage the actuator or actuating means enabling the tool attached to the gear assembly to be easily removed therefrom.

The present invention also includes an optional adapter for interpositional engagement between the cylinder member and the rotatable shaft portion of the drill.

Accordingly, it is but one advantage of the present invention is the ability to incorporate the internal working components of the above-mentioned Enstrom ratchet into a cylindrical housing to comprise an adapter for a drill in the nature of a tool chuck.

BRIEF DESCRIPTION OF THE DRAWINGS

FIG. 2 is an exploded perspective view of the present invention shown in relative alignment with a drill chuck;

FIG. 4 is an exploded partial cross-sectional view of the invention as shown primarily in FIG. 3; and FIG. 5 is an elevated perspective view of components of the present invention shown in FIG. 4.

DETAILED DESCRIPTION OF THE PREFERRED EMBODIMENT(S)

Figure 1:
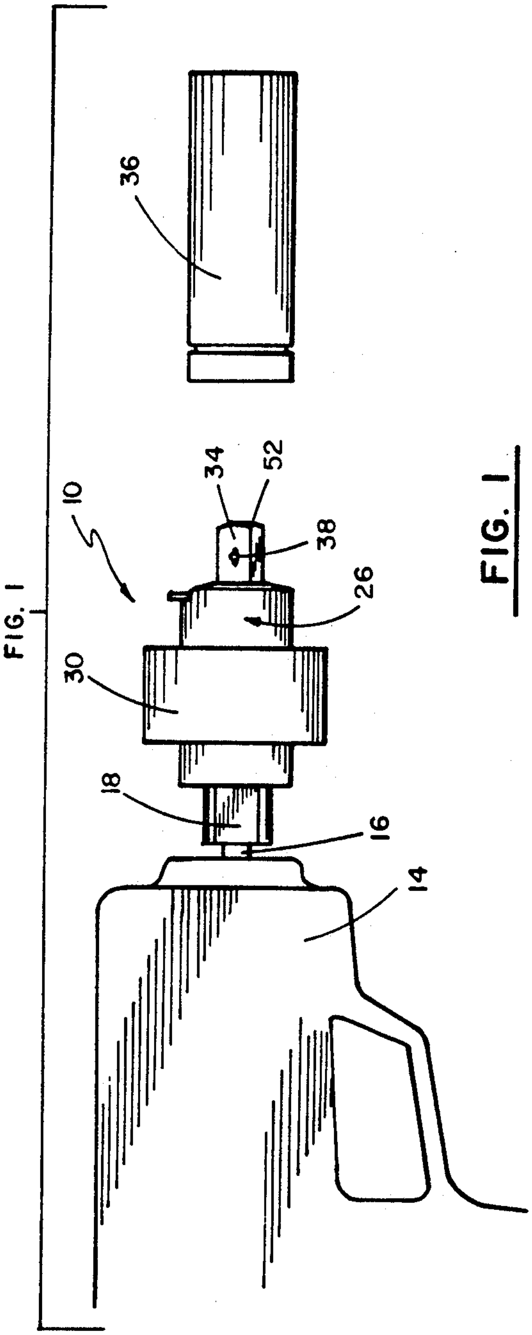
FIG. 1 is an exploded perspective view of the invention attached to a power tool such as a hand held drill with a socket in relative alignment therewith.

With reference to FIGS. 1 and 2, an embodiment of the present invention is designated generally by the reference numeral 10, and shown in relative alignment with a tool 14 having a rotatable spindle 16.

As shown in FIG. 1, the invention 10 is attached to spindle 16 at the end 18 of the cylinder component 26. This embodiment and attachment will be more fully defined with the discussion of FIG. 3 below.

With respect to FIG. 2, spindle 16 is attached to drill chuck 20 and the invention 10 is attached to the chuck by virtue of an interpostional adapter 22. The adapter 22 has a threaded portion 24 which engages the cylindrical body 26 at its end 28.

A slidable collar 30 is fitted about the cylinder 26. Collar 30 incorporates a push-rod 32 which extends transversely across the diameter of the collar 30. (See FIGS. 3 and 4.).

Working end 34, which is preferably rectangular in cross-section, is capable of engaging a socket 36 having a rectangular receptable (not shown) to engage the working end 34. A retaining means or retaining component 38 is visible and is provided to selectively engage the socket 36 holding it in place on the work end 34.

Figure 3:
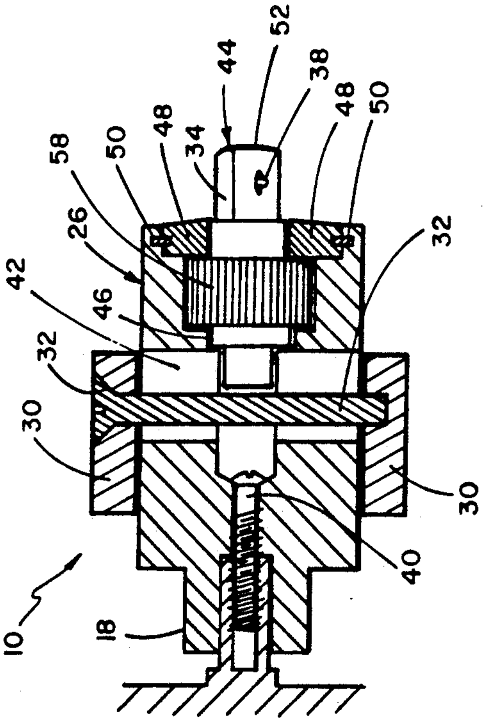
FIG. 3 is a partial cross-sectional view of the invention with the gear assembly drawn in isometric view.

With reference to FIG. 3, cylinder means 26 is attached to spindle 16 at cylinder end 18 by virtue of a conventional fastener 40. Channel 42 is positioned transversely through the cylinder means 26 to enable the combination of collar 30 and push-rod 32 to reciprocate therein.

Gear assembly means designated generally by the reference numeral 44 is held in a gear assembly receiving cavity 46 by virtue of a locking collar 48 and split ring 50 (see FIG. 5).

In the preferred embodiment of the invention, gear assembly 44 is substantially identical to the internal working components of the ratchet disclosed in the U.S. Patent to Enstrom, which has been incorporated by reference as if fully set forth herein.

Of course, the retaining apparatus described and disclosed in Enstrom can be modified somewhat such that shank member as contemplated by Enstrom can have a closed end as disclosed in FIGS. 1, 2, 3, and 4 herein. The closed end is designated generally by the reference numeral 52.

With reference to FIGS. 3 and 4, gear assembly 44 has a push button 54 similar to that disclosed in Enstrom to actuate the shank member. A cooperating torsional spline configuration is designated by the reference numerals 56 and 58 such that splines 56 of the cylinder 26, and splines 58 of the gear assembly 44 as shown in FIGS. 3 and 4 cooperatively and positively engage one another so as to prevent rotational movement of the gear assembly 44 with respect to the cylinder 26.

As stated above and shown in FIGS. 3, 4, and 5, retaining collar 48 is positioned over the gear assembly 44 in collar space 60 and retaining ring 50 occupies ring groove 62 as best shown in FIG. 3, to retain the gear assembly 44 in its installed position in the cylinder means 26.

MODE OF OPERATION

In use, the present invention is coupled to a rotating portion or shaft of a tool, for example, in the manner described above. When the tool is powered, the spindle of the tool imparts a rotational force on the cylinder member 26 and the gear assembly 44 by virtue of the cooperating torsional spline configuration.

A socket is attached to the working end 34 of the gear assembly 44 enabling the socket to rotate therewith. Button 38 prevents inadvertent disengagement of the socket 26 from the working end 34. When disengagement of the socket is desired, collar 30 and push-rod 32 are reciprocated within the groove 42 as best seen in FIG. 3 so that push-rod 32 engages push button actuator 54 of the gear assembly.

I claim:

1. A tool chuck, for a portable hand drill having a rotatable portion, comprising:

a cylinder member adapted for rotational engagement with the rotatable portion of said drill;

gear assembly means removably engageable with said cylinder member for attaching a tool and enabling said tool to move rotatably with said cylinder member;

releasing means for disengaging a tool from said gear assembly means.

2. The tool chuck of claim 1 further comprising:

adapter means for interpositional engagement between said cylinder member and the rotatable portion of said drill.

3. The tool chuck of claim 1 wherein said releasing means further comprises:

an actuating means for releasing a tool attached to said gear assembly, and a cylinder ring means for cooperatively engaging said actuating means and said cylinder member.

4. The tool chuck of claim 3 wherein said cylinder ring means further comprises:

a push rod transversely mounted to a sliding collar for engagement with said actuating means.

5. The tool chuck of claim 1 further comprising:

retaining means for retaining said gear assembly in a cooperative positive engagement with said cylinder member.

6. The tool chuck of claim 1 wherein:

said cylinder member has a geared portion cooperatively engageable with a corresponding geared portion of said gear assembly for prevention of rotational movement therebetween.

7. The tool chuck of claim 5 wherein said retaining means further comprises:

a bearing plate and a snap ring engageable with said cylinder member.

8. A drill chuck, for a portable hand drill having a rotatable portion, comprising:

a cylinder means removably attached to said rotatable portion of said drill for transferring rotational forces to a tool;

a gear assembly;

cooperating gear means associated with said cylinder means and said gear assembly for removably attaching said gear assembly to said cylinder means and providing a positive engagement therebetween enabling said gear assembly to rotate with said cylinder means;

tool attaching means associated with said gear assembly for operatively engaging and disengaging a tool to be rotated.

9. The drill chuck of claim 8 further comprising:

retaining means engageable with said cylinder means for preventing said gear assembly from becoming inadvertently disengaged from said cylinder means.

10. The drill chuck of claim 9, wherein the retaining means comprises:

a bearing plate and a snap ring.

11. The tool chuck of claim 8 further comprising releasing means for disengaging a tool attached to said gear assembly.

12. The drill chuck of claim 11, said releasing means further comprising:

a cylinder ring and a push rod cooperatively engaged with said cylinder means.

13. The drill chuck of claim 8 further comprising:

an adapter means for interpositional engagement between said cylinder member and said rotatable portion of said drill.

14. A chuck for receiving a tool, comprising:

a gear assembly;

a cylinder member;

cooperating rotational spline means, a component of which is associated with the gear assembly and a component of which is associated with the cylinder member, for preventing rotational movement between the gear assembly and cylinder member.

15. The chuck of claim 14 wherein the gear assembly is configured to receive a tool and the invention further comprises a releasing means for disengaging a tool from the gear assembly.

16. The chuck of claim 14 further comprising:

adapter means for interpositional engagement between the rotatable portion of a drill and the cylinder member.

* * * * *